106-92 *Slurry - [illegible]* CROSS REFERENCE EXAMINER
*(PC + acid starch sulfate + salts)* [handwritten annotation]

United States Patent Office 2,896,715
Patented July 28, 1959

2,896,715

HYDRAULIC CEMENTS

Rufus V. Jones, Bartlesville, Okla., assignor to Phillips Petroleum Company, a corporation of Delaware No Drawing. Application May 5, 1952
Serial No. 286,182

19 Claims. (Cl. 166—31)

This invention relates to cements having retarded rates of hydration or set, to slurries of such cement, and to the method of making these slurries. The cement with which the invention is concerned is preferably a Portland or Portland-type cement. In another aspect it relates to any hydraulic cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of acid starch sulfate or a salt of said acid starch sulfate, this invention relating first to said compositions of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations, such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled.

Two possible methods of making acid starch sulfate and its salts are disclosed in my prior U.S. Patents 2,686,779 of August 17, 1954, and 2,697,093 of December 14, 1954, filed July 18, 1949, and December 16, 1949, respectively.

Among the objects of the invention is the provision of a cement having a retarded rate of hydration, or retarded set, as it will be hereinafter termed, particularly at elevated temperatures up to and above 300° F. and/or at high pressures up to and above 20,000 pounds per square inch, such as are encountered in cementing of deep wells.

One object of the present invention is to provide a suitable hydraulic cement aqueous slurry, and suitable processes employing the same, for cementing casing in wells, for squeeze cementing in wells, and for grouting cracks, fractures or voids, in natural formations, such as in wells, or in man-made formations such as dams, breakwaters, wells and massive foundations and structures of all types.

Another object of this invention is to provide a dry hydraulic cement powder which is a novel composition of matter, and which may be mixed with water to form an aqueous cement slurry which is a novel composition of matter and which has at least one of the following useful properties: a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few days. It would be even more desirable to have it attain its final set in about 24 hours but often this is not attainable.

As pointed out in the preceding paragraph, the most important function of the hydraulic cement aqueous slurry of the present invention is that it has a retarded time of initial set, and therefore remains pumpable for a relatively long period of time and a relatively long period of time passes before it thickens, yet it will attain a final set of some considerable strength within a reasonable length of time so that the well-drilling crew is not unduly delayed, but can get back to work and proceed to continue drilling the well bore, or to perforate the casing and/or cement with the usual gun perforating tools known to the art. All types of acid starch sulfate and all salts of all types of acid starch sulfate have sufficient set retarding and thickening time extending properties to be used commercially in the practice of the present invention, and when the acid starch sulfate or salt of starch sulfate is carefully prepared so that a relatively high degree of sulfate substitution has occurred with relatively low amounts of degradation of the starch molecules, a secondary effect is achieved, which, while not as important as the first mentioned effect of delaying the time of initial set and extending the thickening time of the cement, is also of considerable value in cementing oil wells, namely, the aqueous cement slurry containing the minor but effective amount of acid starch sulfate or salt of acid starch sulfate has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formations will absorb water from the cement slurry causing it not only to plug the annulus between the casing and the wall of the well, but also to have insufficient water for normal hydration upon setting, and the greater will become the realization of the need for low water-loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown agent, water or drilling mud, which is forced ahead of the aqueous hydraulic cement slurry into the formation to split the same and enlarge the fractures or cracks to be filled, because if ordinary hydraulic cement aqueous slurry were employed it would lose water to the formation or foundation so rapidly that the cement slurry would start to set before much penetration has been effected. When a relatively low water-loss hydraulic cement aqueous slurry is employed, the amount of breakdown agent can be greatly reduced, or entirely eliminated, because the low water-loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

It is not believed necessary to have a drawing, or to describe minutely the well known cementing operations disclosed in such patents as U.S. 2,795,507 and 8.

By hydraulic cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, puzzolan cements, natural cements and Portland cements. Puzzolan cements include slag cements made from slaked lime and granulated blast furnace slag. Because of its superior strength Portland cement is preferred among the hydraulic cements, but as the art of cements recognizes hydraulic cements as a definite class, and as results of value may be obtained with acid starch sulfate, or salts of acid starch sulfate, with any member of that class, it is desired to claim all hydraulic cements. In addition to the ordinary construction grades of Portland cement or other hydraulic cements, modified hydraulic cements and Portland cements designated as high-early strength cement, heat resistant cement, and slow-setting cement may be used in the present invention.

In most oil well cementing and grouting operations it is generally desirable to use neat cement for added strength, but obviously it is always possible to add to the hydraulic cement, water, and acid starch sulfate or salt of the same, any desired amount of an inert granular filling material or aggregate such as sand, ground limestone, or any of the other well known inert or even cementitious aggregates, as long as simple tests show the amount added does not reduce the compressive strength after final set below the desired value. For example, in plugging porous formations, bentonite or other clays are often added to hydraulic cement aqueous slurries, as taught by U.S. Patent 2,041,086 of May 19, 1936, or iron oxide or barium sulfate is added to make heavy cement. Any of these aggregates can be added to the aqueous hydraulic cement slurry of the present invention in the usual proportions used in the prior art.

In operations in previously uncased wells it is often desirable to use neat cement in the practice of the present invention, because inert filling material may automatically become detached from the walls of the well, and will tend to mix with and dilute the slurry to such an extent that it is undesirable to add any filling material to the slurry being forced into the well. It is customary in the prior art when cementing to make simple tests as to time of set, compressive strength, etc., on samples of the proposed mix.

The amount of water added to the cement of the present invention is not critical, it being obvious that sufficient water should be added to form a pumpable slurry, and that when the slurry becomes pumpable no further water need be added. One advantage of the slurry of the present invention when a relatively less degenerated acid starch sulfate or salt of the same is used is that it is a low water-loss slurry, and therefore it is not necessary to add much excess water over the amount making the slurry pumpable as a reserve for expected losses, which excess water might tend to reduce the final compressive strength of the cement.

It has been found that all hydraulic cements, especially Portland and Portland-type cement aqueous slurries can be retarded in setting time, the time of thickening extended, and in some cases the water-loss tendencies retarded, so that they meet all the above requirements for the satisfactory cementing of deep wells and like operations by the addition of a minor but effective amount of from 0.05 to 5% by weight of the dry hydraulic cement of acid starch sulfate, or the metal, ammonium or organic base, or other salts of an acid starch sulfate, without seriously affecting the other desirable properties of the cement. It is preferred at present to use the sodium or potassium salts of acid starch sulfate merely because these salts are readily available commercially and therefore relatively inexpensive. However, good results will be obtained using any other alkali metal salt, such as the lithium, rubidium, caesium and other rare alkali metal salts, or the ammonium or organic base salts of acid starch sulfate, all of which are water soluble. Typical organic base salts that can be used are those derived from ammonia such as methyl amine, dimethyl amine and quaternary ammonium bases; also pyridine, morpholine, and the like. In addition the alkaline earth metal salts such as the barium, calcium, strontium, and magnesium, and the heavy metal salts such as the aluminum, iron, copper, lead, silver, mercury, nickel, and all other salts of acid starch sulfate (which are probably insoluble in water but which hydrolyze in the hydraulic cement aqueous slurry which is an aqueous alkaline solution) are just as useful in this invention in the aqueous hydraulic cement slurry which is quite alkaline. Acid starch sulfate and all of its salts, whether such salt is formed in the aqueous hydraulic cement slurry by hydrolysis of some water-insoluble salt, are all valuable in amounts of 5 percent or less, based on weight of dry cement, in retarding the set of aqueous hydraulic cement slurry, especially at the temperature and pressure encountered in cementing a well, and in many instances the acid starch sulfate or salt will decrease the water loss from said aqueous hydraulic cement slurry to porous formations encountered in the well.

While 0.05% to 5% of acid starch sulfate or its salts by weight of the dry hydraulic cement will give valuable results, it has been found that from 0.2 to 1% is the most preferred range in wells less than 14,000 feet deep and less than 300° F., the use of 0.5% being particularly effective in such wells, and the percentage above 1% being chiefly of value in still deeper and hotter wells.

The term acid starch sulfate and its salts includes all starch compounds which may be regarded structurally as being the starch monoesters of sulfuric acid and the metal, ammonium or other salts thereof. The starch acid sulfate esters are characterized by the typical sulfate linkage:

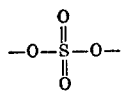

wherein S is sulfur, and O is oxygen.

It will be seen that the reaction product of starch and sulfuric acid or chlorosulfonic acid contains the sulfate linkage:

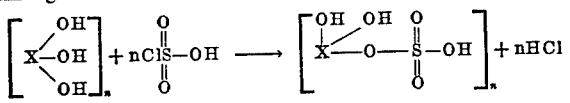

wherein

is an anhydroglucose unit of the starch molecule and $n$ is the number of such units in such starch molecule, the formula showing mono-substitution in each unit, whereas in actual practice some units have double or triple substitution and many units have no substitution at all, the degree of substitution merely being an average value.

Acid starch sulfate and its salts may be prepared by a number of sulfating methods old in the prior art, employing either sulfur trioxide gas and the starch alone, or sulfuric acid and/or sulfur trioxide along with various diluents to retard the reaction making it a sulfation reaction with the starch, and preventing oxidation, and no matter how the acid starch sulfate is made, it and any of its salts will act to retard the set of a hydraulic cement aqueous slurry and to increase the time before the cement thickens to the point where it is not pumpable. While not to be considered as limits, a relatively high degree of sulfate substitution for the present invention is about 0.2 or more out of the 3.0 possible in each anhydroglucose unit in the starch molecule (which unit has 3 hydroxyl groups which can be substituted).

The acid starch sulfate or salts thereof may be prepared by any one of several methods as described above, but one of the preferred methods is the reaction of starch with a complex of sulfur trioxide, for example, pyridine-sulfur trioxide, in the presence of a tertiary amine, such as pyridine, and an inert diluent to form the desired product. The specific details of the process described in the last sentence are outlined in my said Patent 2,697,093, in which said process of preparing acid starch sulfate and its salts is claimed. The acid starch sulfate may also be prepared by the reaction of starch with an alkali metal chloro-sulfonate under anhydrous conditions, and in the presence of an inert diluent such as benzene, and a tertiary amine. The specific details of this process are outlined in my said Patent 2,686,779, in which this process of producing acid starch sulfate and its salts is claimed. Still other methods of preparing acid starch sulfate and salts of the same include the reaction of starch with chloro-sulfonic acid in the presence of an inert diluent and tertiary amine.

Portland cement is a mixture of complex silicates and aluminates of calcium containing excess lime. The setting or hardening is a result of the hydration or other chemical readjustments of the various components. Generally speaking, three periods in the set are recognized: "initial," "final" and "hardening" sets. The initial set normally occurs at ordinary temperatures in from one or two hours after the mixing, the final set two to five hours later and the hardening continues for an indefinite time but it is substantially complete in about 30 days.

The initial set is said to have occurred when a cement slurry has lost its plasticity to such a degree that the two pieces of a broken specimen will not unite to form a homogeneous mass when placed in close contact. The individual grains of a cement slurry must remain undisturbed in intimate contact with each other for a time before the initial set occurs in order to produce a coherent mass. Agitation during the latter part of the period of initial set will prevent the cement from hardening properly to the desired homogeneous, coherent mass.

In order to form a perfect seal in cementing wells, it is necessary that the cement be placed before the initial set occurs and it is desirable that it be placed and allowed to stand for a short period before the initial set begins. With the equipment available, there is a limit to the time in which it is possible to mix a cement and pump it into the bottom of the well and up around the casing to the location desired.

Another reason it is necessary to have the cement in place before the initial set begins is that the viscosity rises as the setting progresses. This increases the difficulty of pumping and is undesirable because of the added strain on the pumping equipment.

It is possible to retard the rate of set, within narrow limits, by increasing the alumina content of the cement, but this method is not widely used because of the high cost of high alumina cements and the limited effective range. The rate of set can be retarded also by increasing the amount of water present in the mix. However, above about 35 to 50 percent water, based on the weight of dry cement, increased amounts of water will result in weaker cement and there is no way of knowing exactly how much dilution will result from water encountered in the well. Addition of small amounts of gypsum, or calcium sulfate will result in a retarded rate of set, but an excess will increase the rate and may cause the cement to disintegrate or be weakened. It is therefore, highly desirable that a retarded cement such as mine be available for cementing work.

The most convenient method of using acid starch sulfate or its salts in cement is to run the same and the hydraulic cement through a rotary mixer to produce intimate mixing and later add water to form a fluid slurry. However, the acid starch sulfate or its salts may be added directly to the cement and water at the time of mixing at the well, or the acid starch sulfate or its salts may be dissolved in the water with which the cement is mixed, with substantially the same result. The method of mixing is not critical as long as a somewhat uniform mixture is produced.

The rate of hydration or set of cement is ordinarily increased by an increase in temperature. Since the bottom hole temperature in the well may be considerably higher than the atmospheric temperature, it is desirable that a method such as I have described be available for use in the cementing of oil wells. My method is effective at elevated temperatures as well as at ordinary atmospheric temperatures, because obviously a set retarding agent operative at atmospheric temperatures will also retard the set at higher temperatures.

While it is not desired to limit the present invention by any theory of operation and while the scope and validity of the claims do not depend upon the validity of any theory of operation, it is believed helpful in understanding the invention to think of the acid starch sulfate or its salts temporarily absorbing so much of the water that the Portland cement is only slowly able to obtain enough water to make its initial set, whereby the initial set of the cement is greatly retarded. Finally the Portland cement particles take the water away from the water soluble starch particles and attain an initial and then a final set with suitable strength in the cement for use in oil well cementing operations.

EXAMPLE I

A neat Portland cement aqueous slurry having a density of 14 pounds per gallon was tested without any additive, and with 1% of the weight of the dry cement of sodium starch sulfate (abbreviated Na starch SO₄ in Table I below). To furnish a comparison, mixtures of a similar 1% of ordinary soluble starch and two trade marked soluble starches (Shopal 8-A and Amioca) in the same slurry are also reported.

*Table I*

| Test No. | Cement | Percent water as percent dry cement | Additive | Percent addition as percent dry cement | Halliburton thickening time at 180° F. in hrs. | Water loss, mls./mins. | |
|---|---|---|---|---|---|---|---|
| | | | | | | 3 min. at 75° F. | 1 hr. at 180° F. |
| 1 | Portland | 40 | None | 0 | 0.8 | 45/0.4 | |
| 2 | do | 40 | Soluble starch | 1.0 | | 18/0.3 | 18/0.3 |
| 3 | do | 40 | Shopal 8-A | 1.0 | | 20/0.4 | Set |
| 4 | do | 40 | Amioca | 1.0 | | 16/0.1 | Set |
| 5 | do | 40 | Na starch SO₄ | 1.0 | | 25/20 | |

These slurries were all tested for water-loss according to the procedure set forth in API Code 29 for drilling muds. This test measures the cubic centimeters of filtrate that can be forced through a standard filter paper in 30 minutes by a 100 pounds per square inch gauge pressure differential, which has been found to give a very good indication of what would be lost to an exposed porous sand formation in an oil well, whether from the well drilling mud or from cement being placed in the well.

Obviously the sodium starch sulfate ester is much more effective than soluble starch in reducing the excessive water loss of the Portland cement slurry alone. The neat Portland cement slurry lost 45 ml. of its available water in 0.4 minute, becoming immediately unpumpable, and the slurries with the soluble starches reached the same unpumpable state in about the same time, but that with the sodium starch sulfate was just as pumpable at the end of 20 minutes of exposure to water-loss as it was at the start, except that it was 20 minutes further along in the process of taking an initial set. This would give a tremendous advantage in placing cement in back of casing in a well where it had to be pumped upwards through a narrow annular space past a considerable area of exposed porous sand or rock formations, and would insure placing the cement (by pumping) much further up along the outside of the casing than could otherwise be done, resulting in sealing off more extensive formations and making a better and more extensive bond between the casing and the well hole formations than ever possible before.

EXAMPLE II

The substantial equivalence of the various salts of acid starch sulfate is demonstrated by the following tests in Table II. A representative hydraulic cement was mixed with water to form an aqueous slurry weighing 14 pounds per gallon and tested with and without the additives listed at 180° F. to show how high temperatures in a well would affect it, while the time of thickening was tested according to API Code 32 to determine how long it took the slurry to attain a viscosity of 100 poises as it set, this figure being chosen because slurry over 100 poises viscosity is getting difficult to pump into a well, and of course the compressive strength in pounds per square inch was measured at 180° F. at 1 and 7 days after it set, all as reported in Table II.

One method of preparing the various acid starch sulfates and acid starch sulfates salts for these tests will now be described. Two hundred grams of "Amioca" starch, a trade marked product consisting of starch from a waxey maize, 611 grams of pyridine-SO₃ complex and 1800 grams each of pyridine and benzene were heated and stirred for 8 hours at a reflux temperature of 194° to 196° F. After two hours the reaction mixture became pasty. The starch sulfate was recovered as the pyridine salt. After standing overnight, the clear solvent layer was decanted and the solid reaction mass warmed with methanol. Lumps were broken up by treatment in a Waring blender after which the product was washed free from sulfate ions with methanol.

Pyridine starch sulfate thus prepared was used to prepare the acid starch sulfate and the desired salts.

The sodium starch sulfate was prepared by making a methyl alcohol slurry of some of said pyridine starch sulfate and adding an excess of sodium hydroxide in methyl alcohol and stirring the same together for one hour. The mixture was filtered, washed with methyl alcohol, and dried in a vacuum desiccator. Sufficient sodium starch sulfate was prepared to make the ammonium and acid starch sulfates. Some of the sodium starch sulfate prepared as above was used to make a 10 percent aqueous solution of the same. This was stirred vigorously 30 minutes and then passed through a cation exchange resin to form the acid starch sulfate. Afterward some of the resulting acid solution was neutralized with ammonium hydroxide to give ammonium starch sulfate. The calcium starch sulfate was prepared by making a methyl alcohol slurry of the pyridine starch sulfate and stirring the same with an excess of calcium chloride in a methyl alcohol solution for one hour. The product was filtered, washed free of chloride ions, and dried in a vacuum desiccator.

Other processes have been used to prepare these same salts, and the salts so prepared had substantially the same treating value in aqueous cement slurries, so the mode of preparation is unimportant provided the chemical product desired is produced.

*Table II.—Tests of Example II*

| Test No. | Additive | Amount add. (percent by weight of dry cement) | Thickening time, hr.: min. to reach 100 poises at 180° F. | Compressive strength | |
|---|---|---|---|---|---|
| | | | | P.s.i. after 1 day at 180° F. | P.s.i. after 7 days at 180° F. |
| 9 | None | 0 | 1:25 | 2,740 | 2,850 |
| 10 | Acid starch sulfate | 0.5 | 4:50 | 1,860 | 3,260 |
| 11 | Sodium starch sulfate | 0.5 | 3:45 | 1,120 | 1,410 |
| 12 | Calcium starch sulfate | 0.5 | 5:39 | 380 | 583 |
| 13 | Ammonium starch sulfate | 0.5 | 3:25 | 2,860 | 2,580 |

Table II clearly shows the increase of thickening time under deep well temperature conditions given by 0.5% by weight of the dry cement of acid starch sulfate and various salts thereof to an aqueous hydraulic cement slurry, all with the retention of sufficient compressive strength to be useful in well cementing.

The retarded set, or extended thickening time, was best measured by the Halliburton "thickening time" by which is meant the time at which the setting cement slurry reaches a calibrated 100 poises of viscosity, which viscosity is approaching about the limit in increasing viscosity that is readily handled by pumps through some thousands of feet of casing and well bore outside the casing in a well.

Baroid filter presses operated at 100 pounds per square inch were used to determine the water-losses of cement slurries.

Thickening times of cement slurries were measured at atmospheric pressure with a Halliburton consistometer.

The water-losses of the cement slurries were determined by the procedure specified for use on drilling fluids by API Code 29 (1942). The treatment of the cement slurry preceding the water-loss determination consisted of mixing the water and cement for three minutes to form the slurry and then storing the slurry in sealed jars in an oven at 180° F.

Thickening times of cement slurries were measured at atmospheric pressure in a Halliburton consistometer according to the procedure described in API Code 32, section XII, paragraphs 54 and 67 (1947). Throughout this report "thickening time" refers to a Halliburton consistometer (atmospheric pressure) thickening time unless otherwise specified.

While numerous examples of the invention have been given for purposes of illustration, the invention is not limited thereto.

Having described my invention, I claim:

1. A cement capable of forming a fluid slurry when mixed with water, said cement having an extended thickening time, said cement comprising a hydraulic cement mixed with a minor proportion by weight of the dry cement of a hydraulic cement thickening time extending agent selected from the group consisting of acid starch sulfate and salts of acid starch sulfate.

2. A cement capable of forming a fluid slurry when mixed with water, said cement having an extended thickening time, said cement comprising Portland cement mixed with a minor proportion by weight of the dry cement of a hydraulic cement thickening time extending agent selected from the group consisting of acid starch sulfate and salts of acid starch sulfate.

3. A cement capable of forming a fluid slurry when mixed with water, said cement having an extended thickening time, said cement comprising a hydraulic cement mixed with 0.05% to 5% by weight of the dry cement of a hydraulic cement thickening time extending agent selected from the group consisting of acid starch sulfate and salts of acid starch sulfate.

4. A cement capable of forming a fluid slurry when mixed with water, said cement having an extended thickening time, said cement comprising Portland cement mixed with 0.2% to 1% by weight of the dry cement of alkali metal starch sulfate.

5. A hydraulic cement slurry having a retarded setting time at temperatures above atmospheric, comprising a hydraulic cement, water and a minor proportion by weight of the dry cement of a hydraulic cement thickening time extending agent selected from the group consisting of acid starch sulfate and salts of acid starch sulfate.

6. A hydraulic cement slurry having a retarded setting time at temperatures above atmospheric, comprising Portland cement, water and a minor proportion by weight of the dry cement of alkali metal starch sulfate.

7. A cement capable of forming a fluid slurry when mixed with water, said cement comprising a hydraulic cement mixed with a minor proportion by weight of the dry cement of sodium starch sulfate.

8. A cement capable of forming a fluid slurry when mixed with water, said cement comprising Portland cement mixed with a minor proportion by weight of the dry cement of alkali metal starch sulfate.

9. A hydraulic cement slurry comprising a hydraulic cement, water, and a minor proportion by weight of the dry cement of alkali metal starch sulfate.

10. A hydraulic cement slurry comprising Portland cement, water, and a minor proportion by weight of the dry cement of sodium starch sulfate.

11. In the method of cementing a casing in a well which comprises pumping down through the casing and upwardly in the annular space between the casing and the borehole an aqueous hydraulic cement slurry, the step of adding to the cement slurry a hydraulic cement thickening time extending agent selected from the group consisting of acid starch sulfate and salts of acid starch sulfate.

12. In the method of cementing a casing in a well which comprises pumping down through the casing and upwardly in the annular space between the casing and the borehole an aqueous hydraulic cement slurry, the step of adding to the cement slurry alkali metal starch sulfate in amounts ranging between 0.2% and 1% by weight of the dry cement in the slurry.

13. In the method of cementing a casing in a well which comprises pumping down through the casing and upwardly in the annular space between the casing and the borehole an aqueous Portland cement slurry, the step of adding to the cement slurry a minor but effective amount of a hydraulic cement thickening time extending agent selected from the group consisting of acid starch sulfate and salts of acid starch sulfate sufficient to extend the thickening time of said slurry.

14. In the method of cementing a casing in a well which comprises pumping down through the casing and upwardly in the annular space between the casing and the borehole an aqueous Portland cement slurry, the step of adding to the cement slurry a minor but effective amount of alkali metal starch sulfate sufficient to extend the thickening time of said slurry.

15. In the method of cementing a casing in a well which comprises pumping down through the casing and upwardly in the annular space between the casing and the borehole an aqueous Portland cement slurry, the step of adding to the cement slurry a minor but effective amount of sodium starch sulfate sufficient to extend the thickening time of said slurry.

16. The process of producing a hydraulic cement aqueous slurry having an extended time of set which comprises admixing with hydraulic cement from 0.05% to 5% by weight of the dry cement of a hydraulic cement thickening time extending agent selected from the group consisting of acid starch sulfate and salts of acid starch sulfate, and mixing and reacting therewith sufficient water to produce a fluid slurry.

17. The process of producing a Portland cement aqueous slurry having an extended thickening time which comprises admixing with Portland cement a minor proportion by weight of the dry cement effective to reduce said water-loss of said slurry of alkali metal starch sulfate and mixing and reacting therewith sufficient water to produce a fluid slurry.

18. The process of cementing a hole which extends into a formation which comprises placing a hydraulic cement aqueous slurry having an extended thickening time adjacent to said formation by admixing with hydraulic cement from 0.05% to 5% by weight of the dry cement of alkali metal starch sulfate, mixing therewith sufficient water to produce a fluid slurry and introducing said slurry into said hole into contact with said formation.

19. The process of cementing a well which extends into a porous formation which comprises placing a Portland cement aqueous slurry having a reduced water-loss adjacent to said porous formation by admixing with hydraulic cement a minor proportion by weight of the dry cement effective to reduce the water-loss of said slurry of hydraulic cement thickening time extending agent selected from the group consisting of acid starch sulfate and salts of acid starch sulfate, mixing therewith sufficient water to produce a fluid slurry and introducing said slurry into said well into contact with said porous formation.

(References on following page)

References Cited in the file of this patent

UNITED STATES PATENTS

| | | |
|---|---|---|
| 1,607,472 | Mathers | Nov. 16, 1926 |
| 2,374,628 | Swayze | Apr. 24, 1945 |
| 2,399,986 | Chapman | May 7, 1946 |
| 2,417,235 | Cannon | Mar. 11, 1947 |
| 2,417,307 | Larsen | Mar. 11, 1947 |
| 2,429,211 | Andes | Oct. 21, 1947 |
| 2,489,793 | Ludwig | Nov. 29, 1949 |
| 2,561,418 | Ryan | July 24, 1951 |
| 2,562,148 | Lea | July 24, 1951 |
| 2,576,955 | Ludwig | Dec. 4, 1951 |
| 2,662,827 | Clark | Dec. 15, 1953 |